United States Patent
Hu et al.

(10) Patent No.: US 9,727,206 B2
(45) Date of Patent: Aug. 8, 2017

(54) METHOD AND APPARATUS FOR REMOVING NOTIFICATION ICONS

(71) Applicant: TENCENT TECHNOLOGY (SHENZHEN) COMPANY LIMITED, Shenzhen (CN)

(72) Inventors: Yuanhan Hu, Shenzhen (CN); Bin Li, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/900,843

(22) PCT Filed: Jul. 10, 2014

(86) PCT No.: PCT/CN2014/081928
§ 371 (c)(1),
(2) Date: Dec. 22, 2015

(87) PCT Pub. No.: WO2015/003633
PCT Pub. Date: Jan. 15, 2015

(65) Prior Publication Data
US 2016/0139771 A1 May 19, 2016

(30) Foreign Application Priority Data
Jul. 10, 2013 (CN) .......................... 2013 1 0288045

(51) Int. Cl.
*G06F 3/00* (2006.01)
*G06F 3/0481* (2013.01)
(Continued)

(52) U.S. Cl.
CPC .......... *G06F 3/04817* (2013.01); *H04L 51/04* (2013.01); *H04M 1/2477* (2013.01);
(Continued)

(58) Field of Classification Search
CPC ... G06F 3/04817; G06F 3/0481; G06F 3/0488
See application file for complete search history.

(56) References Cited

U.S. PATENT DOCUMENTS 8,437,806 B2 5/2013 Kim
2002/0157028 A1* 10/2002 Koue ....................... H04L 9/32
726/3

(Continued)

FOREIGN PATENT DOCUMENTS

CN 101252619 A 8/2008
CN 103076951 A 5/2013
(Continued)

*Primary Examiner* — Linh K Pham
(74) *Attorney, Agent, or Firm* — Harness, Dickey & Pierce, P.L.C.

(57) ABSTRACT

Various examples provide a method and an apparatus for removing notification icons. The method includes: displaying a notification icon corresponding to newly-obtained data on a user interface; obtaining information of the newly-obtained data; obtaining a pre-defined data type corresponding to the newly-obtained data by using the information of the newly-obtained data; obtaining information of a module having access to an interface for removing the notification icon by using the data type; starting the module based on the information of the module; and removing, by the module, the notification icon from the user interface by using the interface.

14 Claims, 4 Drawing Sheets

(51) Int. Cl.
*H04W 4/00* (2009.01)
*H04L 12/58* (2006.01)
*H04M 1/247* (2006.01)
*H04W 68/00* (2009.01)
*H04W 4/12* (2009.01)

(52) U.S. Cl.
CPC ......... *H04W 4/001* (2013.01); *H04W 68/005* (2013.01); *H04M 2250/60* (2013.01); *H04W 4/12* (2013.01)

(56) References Cited

U.S. PATENT DOCUMENTS

| | | | |
|---|---|---|---|
| 2008/0180408 A1* | 7/2008 | Forstall | G06F 3/0482 345/177 |
| 2008/0201664 A1 | 8/2008 | O | |
| 2010/0227651 A1 | 9/2010 | Kim | |
| 2012/0120090 A1 | 5/2012 | O | |
| 2012/0235930 A1* | 9/2012 | Lazaridis | G06F 3/017 345/173 |
| 2013/0067376 A1 | 3/2013 | Kim et al. | |
| 2013/0117718 A1 | 5/2013 | Lazaridis et al. | |
| 2013/0132854 A1* | 5/2013 | Raleigh | G06F 3/0482 715/738 |
| 2015/0200878 A1* | 7/2015 | Shih | H04L 51/046 709/206 |

FOREIGN PATENT DOCUMENTS

| | | |
|---|---|---|
| EP | 2226787 A2 | 9/2010 |
| WO | WO-2012097385 A2 | 7/2012 |

\* cited by examiner

METHOD AND APPARATUS FOR REMOVING NOTIFICATION ICONS

RELATED DOCUMENTS

The present disclosure is a national phase application of PCT/CN2014/081928, filed on Jul. 10, 2014, which claims priority of Chinese patent application No. 201310288045.9, titled "Method and Apparatus for Removing Missed Call Icons", and filed on Jul. 10, 2013 with the Patent Office of the People's Republic of China, the disclosure of which is incorporated by reference.

TECHNICAL FIELD

The present disclosure relates to computer techniques, and particularly, to a method and an apparatus for removing notification icons.

BACKGROUND

Smart phones not only can be used for making phone calls, but also can provide functions related with phone calls, such as displaying missed call icons on a user interface (e.g., in a notification bar or a notification screen), providing call history, and so on. After new data is obtained, e.g., a missed call, a message (e.g., text message, voice message, multimedia message, instant message, etc.), an email, or a system notification message (e.g., a software update notification, etc.), a notification icon corresponding to the newly-obtained data may be displayed on a screen of a phone.

SUMMARY

Various examples provide a method and an apparatus for removing notification icons to remove notification icons without root permissions.

Various examples provide a method for removing notification icons which may include:

displaying a notification icon corresponding to newly-obtained data on a user interface;

obtaining information of the newly-obtained data;

obtaining a pre-defined data type corresponding to the newly-obtained data by using the information of the newly-obtained data;

obtaining information of a module having access to an interface for removing the notification icon by using the data type;

starting the module based on the information of the module; and removing, by the module, the notification icon from the user interface by using the interface.

Various examples also provide an apparatus for removing notification icons. The apparatus may include:

a user interface, configured to display a notification icon corresponding to newly-obtained data on a user interface;

an icon removing engine, configured to obtain a pre-defined data type corresponding to the newly-obtained data by using information of the newly-obtained data, obtaining information of a data manager having access to an interface for removing the notification icon by using the data type, and start the data manager based on the information of the data manager; and a data manager, configured to remove the notification icon from the user interface by using the interface.

In view of the foregoing technical mechanism, after new data is obtained, a module having access to an interface for removing notification icons corresponding to the data type of the newly-obtained data is started, and removes the notification icon corresponding to the newly-obtained data by using the interface. As such, modules not having access to the interface are enabled to remove notification icons through the above technical mechanism.

BRIEF DESCRIPTION OF THE DRAWINGS

Features of the present disclosure are illustrated by way of example and not limited in the following figures, in which like numerals indicate like elements, in which.

DETAILED DESCRIPTIONS

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

Figure 1:
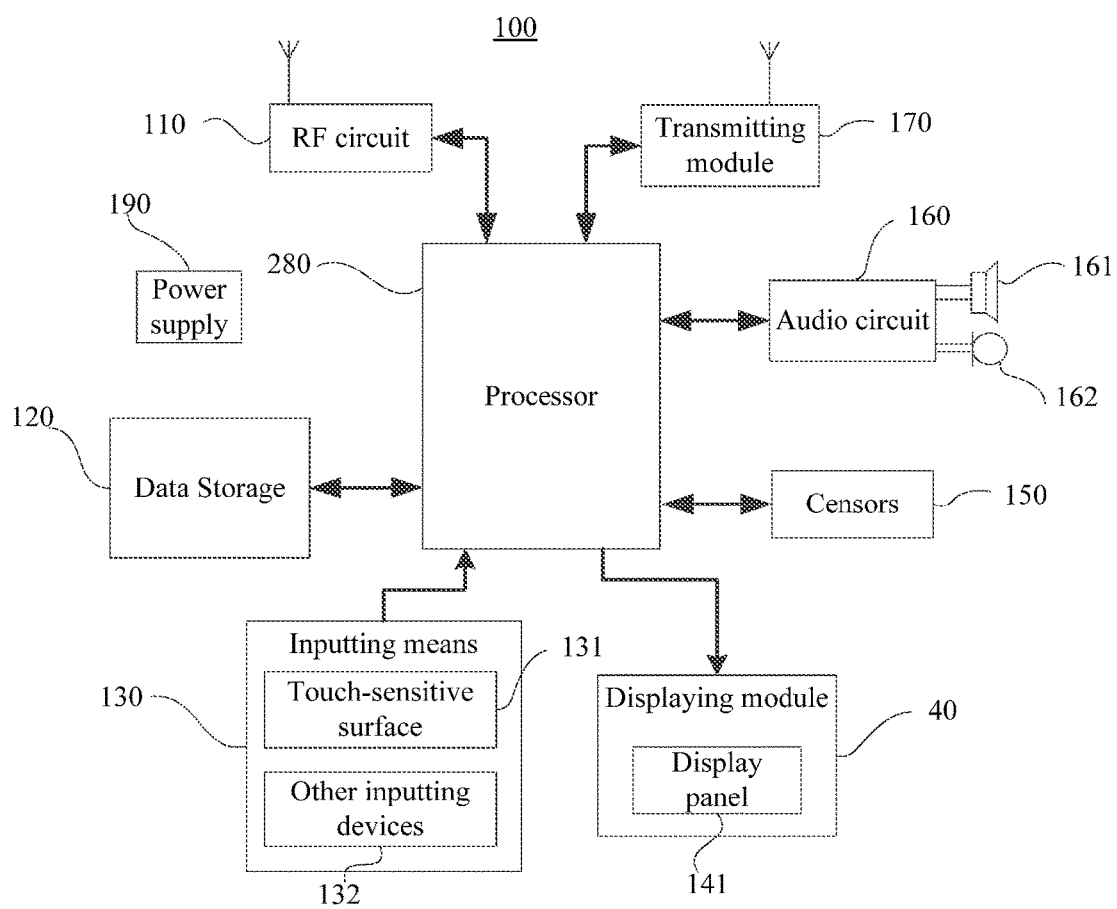
FIG. 1 is a schematic diagram illustrating modules of a terminal device.

FIG. 1 is a schematic diagram illustrating modules of a terminal device suitable for practicing the technical mechanism provided by various examples. As shown in FIG. 1, a terminal device 100 may include: a radio frequency (RF) circuit 110, at least one computer-readable storage medium 120, an inputting unit 130, a displaying unit 140, a sensor 150, an audio circuit 160, a transmitting unit 170, at least one processor 180 and a power supply 190 and the like.

The RF circuit 110 is capable of sending and receiving signals during a process of information sending/receiving process or a voice communication process. In an example, the RF circuit 110 may send downlink information received from a base station to the at least one processor 180 for further processing, and may send uplink data to the base station. The RF circuit 110 may generally include, but not limited to, an antenna, at least one amplifier, a tuner, at least one oscillator, a subscriber identity module (SIM) card, a transceiver, a coupler, a low noise amplifier (LNA), a duplexer, and the like. The RF circuit 110 may perform wireless communications via a network with other devices. The wireless communications may be implemented by any communications standard or protocol including, but not limited to, Global System of Mobile (GSM) communication, General Packet Radio Service (GPRS), Code Division Multiple Access (CDMA), Wideband Code Division Multiple Access (WCDMA), Long Term Evolution (LTE), email, Short Messaging Service (SMS), and so on.

The storage device 120 may store software programs and modules, e.g., the apparatus provided by various examples, and store data generated during practicing the technical mechanism. The processor 180 is capable of executing the software programs and modules stored in the storage device 120 to implement various functions and data processing, so as to practicing the technical mechanism of various examples. The storage device 120 may include an area storing programs and an area storing data. The area storing programs may store an operating system, at least one application program providing a function (e.g., audio playing function, video playing function and so on). The area storing data may store data generated during operation of the terminal device 100 (e.g., audio data, a phone book, etc.) and so on. The storage device 120 may include a high-speed random access memory, and may also include a non-transitory memory, e.g., at least one disk storage, flash memory or other non-transitory solid state storage device and the like. Correspondingly, the storage device 120 may also include a storage controller to provide the processor 180 and the inputting unit 130 with access to the storage device 120.

The inputting unit 130 may receive digits or characters inputted, and generate a keyboard input signal, a mouse input signal, a control lever input signal, an optical input signal, or a track ball input signal which is related with user settings and function controlling. In an example, the inputting unit 130 may include a touch sensitive surface 131 and another inputting device 132. The touch sensitive surface 131, also referred to as a touch screen or a touchpad, is capable of collecting touch operations performed by a user on the surface or near the surface (e.g., an operation performed on or near the touch sensitive surface 131 using any proper object or attachment such as a finger or a touch pen and etc.), and driving a connecting apparatus corresponding to the operation according to a pre-defined procedure. In an example, the touch sensitive surface 131 may include a touch detecting apparatus and a touch controller. The touch detecting apparatus detects the position touched by the user, detects a signal generated by the touch, and sends the signal to the touch controller. The touch controller receives touch information from the touch detecting apparatus, converts the touch information into coordinates of the touch position, sends the coordinates to the processor 180, receives a command sent by the processor 180 and executes the command. The touch sensitive surface 131 may be implemented via various types of touch techniques such as resistive touch screen, capacitive touch screen, infrared touch screen and surface acoustic wave touch screen and so on. In an example, the inputting unit 131 may include another inputting device 130 besides the touch sensitive surface 132. In an example, the inputting device 132 may include, but not limited to, at least one of a physical keyboard, a function key (e.g., a volume control key, a power on/off key and etc.), a track ball, a mouse, a control lever and the like.

The displaying unit 140 is capable of displaying information inputted by the user, information provided for the user and various graphical user interfaces of the terminal device 100. The graphical user interfaces may include any combination of graphics, texts, icons, videos. The displaying unit 140 may include a display panel 141. In an example, the display panel 141 may be implemented by Liquid Crystal Display (LCD), Organic Light-Emitting Diode (OLED) and the like. In an example, the touch sensitive surface 131 may overlay the display panel 141. When detecting a touch operation on or near the touch sensitive surface 131, the touch sensitive surface 131 sends the touch operation to the processor 180 to determine the type of the touch event. Then the processor 180 provides visual output on the display panel 141 according to the type of the touch event. The touch sensitive surface 131 and the display panel 141 may be two independent components respectively for input and output, and may also be integrated to provide input and output in various examples.

The terminal device 100 may also include at least one sensor 150, e.g., an optical sensor, a motion sensor, or other types of sensors. In an example, the optical sensor may include an ambient light sensor and a proximity sensor. The ambient light sensor may adjust the brightness of the display panel 141 according to the strength of ambient light. The proximity sensor may close the display panel 141 and/or the backlight when the terminal device 100 is held close to an ear. A gravity sensor is a type of motion sensor, may detect the amount of acceleration in multiple directions (typically XYZ-axis), the amount and the direction of gravity when kept in stationary, and can be used in applications which need to identify phone postures (such as auto screen rotation, games using the sensing result, magnetometer attitude calibration), features related with vibration identify (such as a pedometer, percussion) and the like. The terminal device 100 may include other sensors, e.g., a gyroscope, a barometer, a hygrometer, a thermometer, infrared sensors and the like, which are not listed further herein.

The audio circuit 160, the speaker 161 and the microphone 162 may provide an audio interface between the user and the terminal device 100. The audio circuit 160 may convert received audio data into electrical signals, and send the electrical signals to the speaker 161. The speaker 261 converts the electrical signals into sound and outputs the sound. The microphone 162 may convert collected sound signals into electrical signals which are received by the audio circuit 160. The audio circuit 160 converts the electrical signals into audio data, and sends the electrical signals to the processor 180 for processing. The processed audio data may be sent to another terminal device via the RF circuit 110, or be output to the storage device 120 for future processing. The audio circuit 160 may also include an ear jack providing communications between a peripheral earphone and the terminal device 100.

WiFi is a short-distance wireless communications technique. The terminal device 100 may adopt a WiFi module 170 to provide wireless broadband Internet access to enable a user to send and receive emails, browse webpages and access stream media and so on.

The processor 180 is a control center of the terminal device 100 which interconnects all of the components in the phone using various interfaces and circuits and monitors the phone by running or executing software programs and/or modules stored in the storage device 120 and calling various functions of the terminal device 100 and processing data. The processor 180 may include one or multiple processing cores. The processor 180 may integrate an application processor and a modem processor. The application processor mainly handles the operating system, user interfaces and application programs, and etc., and the modem processor mainly handles wireless communications. The modem processor may be a standalone processor, not integrated into the processor 280.

The terminal device 100 may also include a power supply 190 (e.g., a battery) providing power for various parts. In an example, the power supply may be logically connected with the processor 180 via a power supply management system to implement functions such as charging, discharging, power management and the like. The power supply 190 may also include any components such as one or multiple AC or DC power supply, a recharging system, a power failure detection circuit, a power converter or inverter, a power status indicator and the like.

The terminal device 100 may also include a camera, a bluetooth module, and the like.

Figure 2:
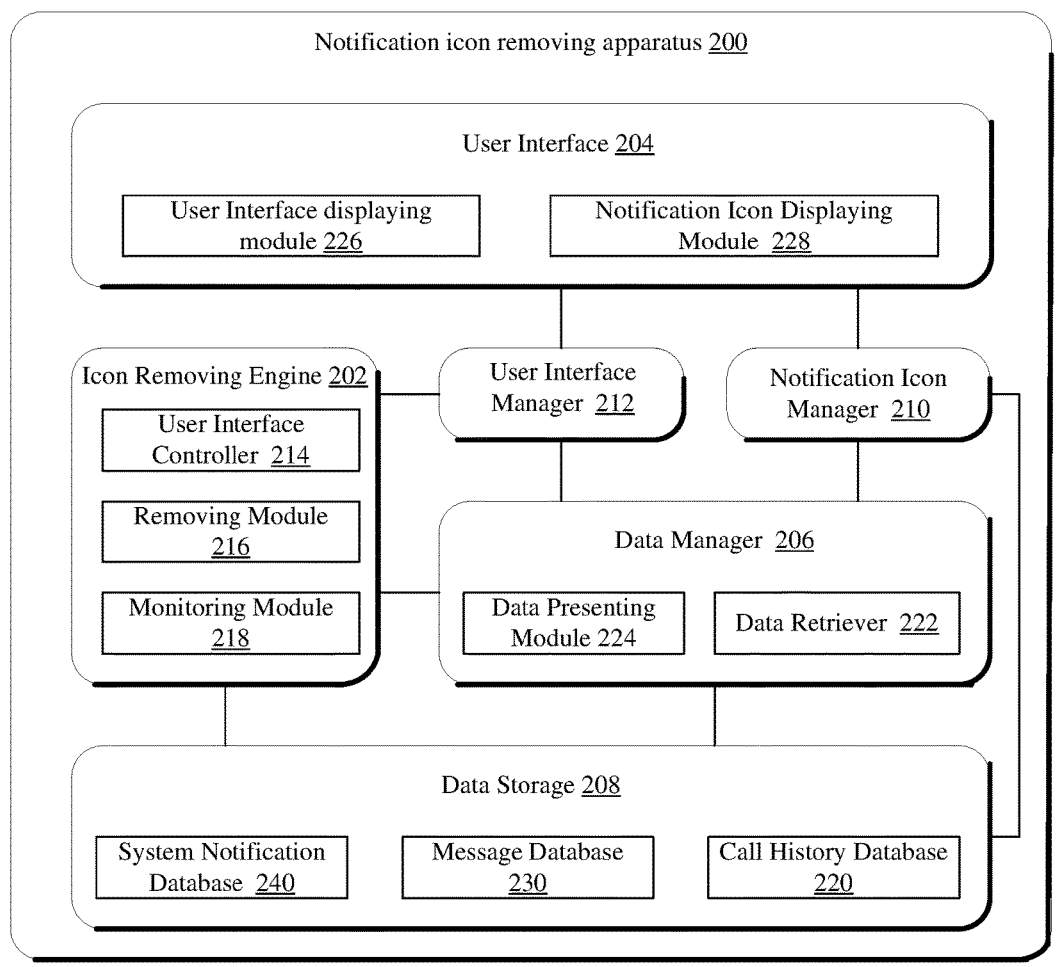
FIG. 2 is a block diagram illustrating modules of an apparatus for removing notification icons in accordance with an example of the present disclosure.

FIG. 2 is a block diagram illustrating modules of an apparatus for removing notification icons. The apparatus 200 generally resides in a terminal device such as the terminal device 100 as shown in FIG. 1. The apparatus 200 can be implemented in software, firmware, hardware, or a combination of software, firmware, hardware, etc. The apparatus 200 as shown in FIG. 2 is only one example of software, firmware, and/or hardware that can perform the subject matter.

Figure 3:
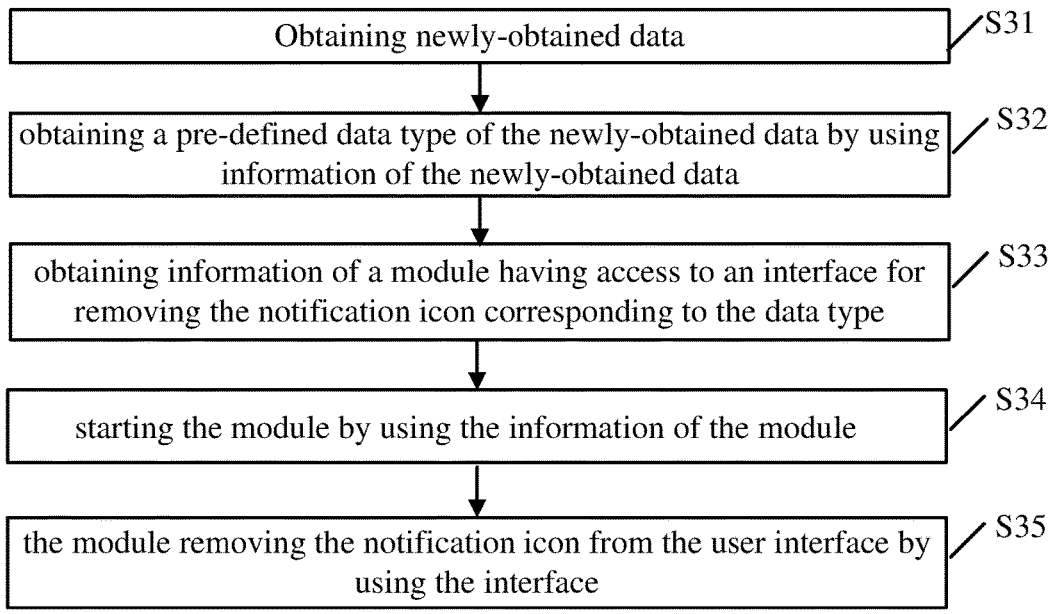
FIG. 3 is a flow diagram illustrating a method for removing notification icons in accordance with an example of the present disclosure.

FIG. 3 is a flow diagram illustrating a process of the apparatus 200 as shown in FIG. 2 removing notification icons in accordance with an example of the present disclosure.

At block S31, the apparatus 200 displays a notification icon corresponding to newly-obtained data on a user interface.

At block S32, the apparatus 200 obtains information of the newly-obtained data.

At block S33, the apparatus 200 obtains a pre-defined data type corresponding to the newly-obtained data by using the information of the newly-obtained data.

At block S34, the apparatus 200 obtains information of a module having access to an interface for removing the notification icon by using the data type.

At block S35, the apparatus 200 starts the module based on the information of the module.

At block S36, the module removes the notification icon from the user interface by using the interface.

As shown in FIG. 2, the apparatus may include a user interface 204, an icon removing engine 202 and a data manager 206.

The user interface 204 may display a notification icon corresponding to newly-obtained data on a screen. The user interface 204 may include a user interface displaying module 226 displaying a host screen or user interfaces of various applications on the screen and a notification icon displaying module 228 displaying various notification icons on the screen.

The icon removing engine 202 may obtain a pre-defined data type corresponding to the newly-obtained data by using information of the newly-obtained data, obtaining information of a module having access to an interface for removing the notification icon (e.g., the data manager 206 in this example) by using the data type, and start the data manager 206 based on the information of the data manager 206.

The data manager 206 may remove the notification icon from the user interface by using the interface. In various examples, there may be more than one data manager 206, or the data manager 206 may include multiple sub modules each having access to an interface for removing notification icons corresponding to a different data type.

As shown in FIG. 2, the apparatus 200 may also include a data storage 208. The data storage 208 may store various types of data. The data storage 208 may include, but not limited to, a call history database 220 which stores call history data (e.g., phone numbers of communication peers, duration of calls, and time of calls, etc. of outgoing calls, received calls, missed calls, audio calls, video calls, multi-party calls), a message database 230 which stores text messages, multimedia messages and etc., a system notification database 240 which stores various system notification messages, e.g., alarm notifications, email notifications, application update notifications, etc.

In an example, the icon removing engine 202 may include a monitoring module 218 and a removing module 216. The monitoring module 218 monitors whether a database in the data storage 208 include data labeled as unread (which is also referred to as newly-obtained data), and obtains information of the data labeled as unread. In an example, the monitoring module 218 may access a database to determine whether the database includes data labeled as unread and obtain information of the data after detecting the data labeled as unread; or register at a notification service and receive a notification indicating the database includes data labeled as unread. The information of the data may include information identifying the type of the data or the database where the data is stored or the notification indicating the database includes the unread data, or other information applicable. The removing module 216 determines a module that has access to an interface for removing the notification icon corresponding to the information of the data obtained by the monitoring module 218 (e.g., the data manager 206), and starts the module.

In an example, a control logic (not shown) may direct operation of the various components and associations between the components of the apparatus 200. In an example, the removing module 216 may generate a request for starting the data manager 206, and send the request to the control logic. The request includes information of the data manager 206. The control logic starts the data manager 206 according to the request.

In an example, the data storage 208 may store various lists and data, e.g., first relations each of which associates information of a data type with a data type, and second relations each of which associates a data type and a module for processing data of the data type, etc. In an example, the removing module 216 may search in pre-defined first relations stored in the data storage 208 for a data type corresponding to information of the newly-obtained data obtained by the monitoring module 218, and obtain information of a module having access to the interface for removing the notification icon from the pre-defined second relations based on the data type obtained.

In an example, the data manager 206 may include a data retriever 222 and a data presenting module 224. The data retriever 222 retrieves the newly-obtained data from a database in the data storage 208 that is corresponding to the data type processed by the data manager 206 (e.g., the call history database 220). The data presenting module 224 provides a user interface manager 212 with a user interface for displaying the newly-obtained data, and sends an instruction via the pre-defined interface for removing the notification icon to the notification icon manager 210 to make the notification icon manager 210 to remove the notification icon corresponding to the newly-obtained data. The user interface manager 212 controls the user interface displaying module 226 to display the user interface provided by the data presenting module 224 on the screen via the user interface 204.

In an example, the notification icon manager 210 is capable of displaying and removing notification icons in the user interface 204. When the data storage 208 obtains new data, e.g., a missed call, a new message, or a new system notification, the notification icon manager 210 displays a notification icon corresponding to the type of the newly-obtained data in the user interface 204. The notification icon can only be removed via an instruction sent to the notification icon manager 210 via a pre-defined interface. In an example, the notification icon manager 210 may include multiple sub modules. Each of the sub modules is corresponding to a data type, and can only be accessed via a pre-defined interface corresponding to the data type. In an example, the pre-defined interface for removing a notification icon may have access restrictions, e.g., only specified modules can access the interface, or only modules having certain permission (e.g., system administrator permission, root permission, superuser permission, etc.) can access the interface. In an example, the data manager 206 has access to the interface for removing the notification icon, i.e., the notification icon can be removed only when the data manager 206 sends an instruction via the interface to the notification icon manager 210.

In an example, the icon removing engine 202 may also include a user interface controller 214. After the removing module 216 starts the module capable of removing the notification icon, e.g., the data manager 206, the user interface controller 214 stores a currently-displayed user interface into the user interface manager 212. After the data manager 206 instructs the notification icon manager 210 to remove the notification icon from the user interface 204, the user interface controller 214 instructs the user interface manager 212 to display the previously stored user interface in the user interface 204 to recover the user interface displayed before the notification icon is removed.

Figure 4:
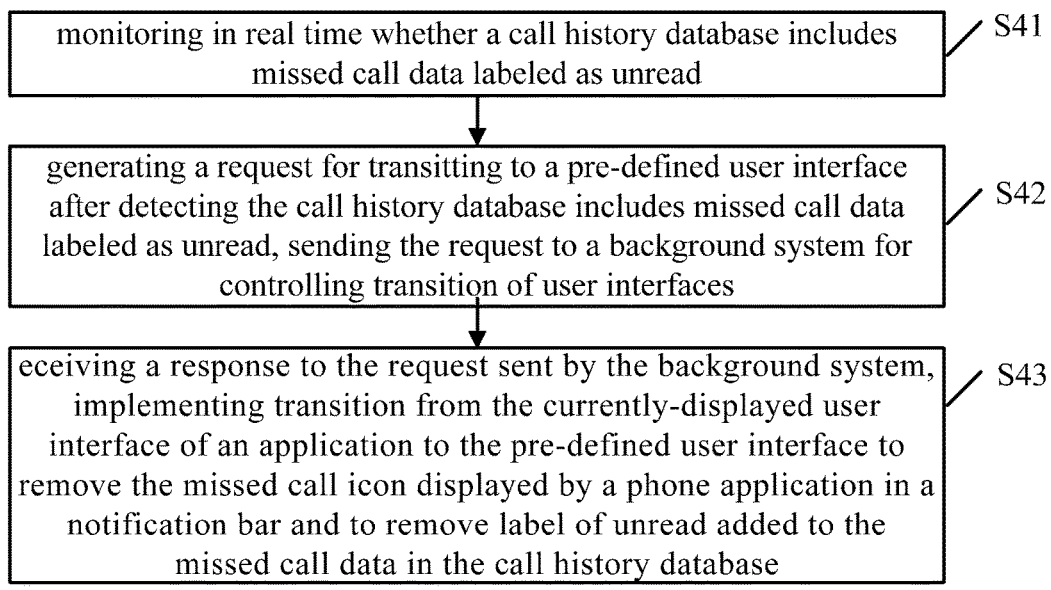
FIG. 4 is a flow diagram illustrating a method for removing notification icons in accordance with an example of the present disclosure.

FIG. 4 is a flowchart illustrating a method according to an example of the present disclosure. The method is applicable to an Android-based user terminal. The follows takes removal of a missed call icon as an example. As shown in FIG. 4, the method may include the following procedures.

At block S41, it is monitored in real time whether a call history database includes missed call data labeled as unread.

The call history database is a module or region within a data storage of a user terminal which stores call history of a user. When new missed call data is stored into the call history database, a label of unread is added to the data indicating the data is unread by the user, and a notification icon for missed call is displayed in a notification bar or a notification screen on a screen of the user terminal (e.g., a smart phone).

In an example, the call history database may be accessed at intervals by using a database accessing interface provided by an operating system to check whether there is missed call data labeled as unread. In an example, data changes may be monitored by using a notification mechanism provided by the operating system. For example, an application may register at the operating system for monitoring the call history database or monitoring missed call data so that when the data in the call history database is changed, the notification mechanism may notify the application of the change in missed call data. For example, Android system provides a content resolver (ContentResolver) function for accessing data and monitoring data changes, i.e., the ContentResolver can be used for actively visiting the data or for obtaining data change notifications after proper registration at the operating system. In an example, data labeled as unread in the call history database may be monitored in block S41 by using the ContentResolver.

At block S42, after it is monitored that the call history database includes data labeled as unread, a request for transiting to a pre-defined user interface is generated and sent to a background system for controlling transition between user interfaces.

The background system may be the Android system.

In an example, the pre-defined user interface is a pre-defined user interface which results in removal of a missed call icon, i.e., a user interface of a module or an application having access to an interface for removing the missed call icon. The module or the application regards the user has been informed of the newly-obtained data after presenting the data to the user in the pre-defined user interface, thus calls the interface to remove the missed call icon.

In an example, the pre-defined user interface for removing the missed call icon may be the user interface of the CallLog application. In various examples, the pre-defined user interface may be a user interface of another application capable of removing the missed call icon.

The Android system provides an intent mechanism. A request may be presented to the Android system through the intent mechanism, and the Android system implements a task in response to the request. For example, in an application for maintaining contact information, after a contact in a contact list is clicked on, an intent may be generated to display detailed information of the contact. The intent informs the Android system that the user wants to perform a "view" action, and the object of the view action is the contact. After the intent is delivered to the Android system, the Android system may act according to the intent to satisfy the demand of the user for viewing detailed information of the contact.

Therefore, an intent according to the intent mechanism of Android system may be generated in block S42 as the request for transiting to the pre-defined user interface.

Figure 5:
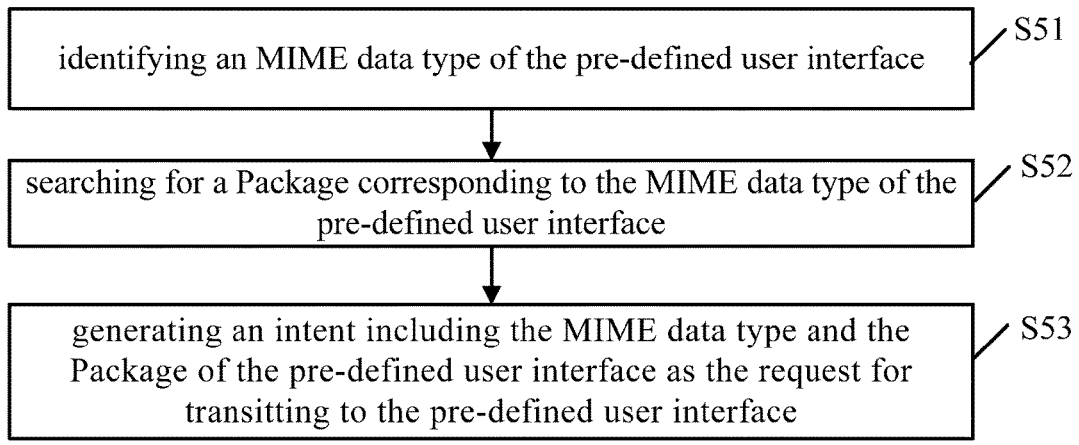
FIG. 5 is a flow diagram illustrating a method for establishing an Intent in accordance with an example of the present disclosure.

In an example, the intent in block S42 may be generated according to the flow as shown in FIG. 5 which will be described in below.

After receiving the request, the Android system responds to the request, displays the pre-defined user interfaced based on a Secure Multipurpose Internet Mail Extensions (MIME) and a package name in the request to implement transition from the currently-displayed user interface of an application to the pre-defined user interface.

At block S43, the response to the request sent by the system is received, the transition from the currently-displayed user interface to the pre-defined user interface is implemented to remove the missed call icon displayed by a phone application in a notification bar. The label of unread added to the missed call data in the call history database is also removed.

Since the pre-defined user interface is a user interface for removing the missed call icon, displaying of the pre-defined interface results in removal of the missed call icon displayed by the phone application in the notification bar. Meanwhile, the label of unread added to the missed call data in the call history database is also removed. As such, an application without root permissions is enabled to remove the missed call icon.

Hence, the process as shown in FIG. 4 is completed.

In the above block S43, the transition from the currently-displayed user interface to the pre-defined user interface may be implemented through an activity transition mechanism provided by the Android system. After the transition, the pre-defined user interface floats to the top of an activity stack, and the user interface of the application is switched to a position next to the stack top in the activity stack (i.e., the second layer). In an example, the pre-defined user interface is not maintained at the top of the activity stack, i.e., the pre-defined user interface is not kept being displayed on the terminal screen. The terminal may recover the previously displayed user interface of an application by using one of the following two methods.

According to method one, it is checked in real time whether the label of unread added to all missed call data has been removed from the call history database.

After it is detected that the label of unread has been removed from all missed call data in the call history database, a transition from the pre-defined user interface to the user interface of the previous running application is implemented. If the label has not been removed, the real time checking whether the label has been removed is continued.

According to method two, a timer is started when it is requested to remove the label of unread added to missed call data in the call history database. The duration of the timer may be configured according to experience. When the timer expires, the transition from the pre-defined user interface to the previously-displayed user interface of the application is implemented.

In the above two methods, the terminal may implement the transition from the pre-defined user interface to the application user interface by using the activity transition mechanism of the Android system. After the transition, the application user interface floats to the top of the activity stack, and the pre-defined user interface is switched to the second layer of the activity stack. Thus, when the user touches a return identity on the application user interface, the terminal may transit from the application user interface to the pre-defined user interface at the second layer of the activity stack. In fact, when the user touches the return identity, it is not necessary to transit to the pre-defined user interface. Thus, in an example, the terminal is controlled to transit from the current application user interface to the host screen when the user touches the return identity on the application user interface. The return identity may include, but not limited to, a return key.

In order to control the terminal to transit from the current application user interface to the host screen, a flag for transition to the host screen is added into an intent generated and sent by the terminal to the Android system. In an example, the flag may be:

Intent.FLAG_ACTIVITY_TASK_ON_HOME.

After receiving the intent including the flag, the Android system may respond to the intent and control the terminal to transit from the current application user interface to the host screen.

FIG. 5 is a flow diagram illustrating a method for establishing an intent in accordance with an example of the present disclosure. As shown in FIG. 5, the process may include the following procedures.

At block S51, an MIME data type of a pre-defined user interface is identified.

In an example, the pre-defined user interface is the user interface of a CallLog application. In different terminals, the package name (referred to as Package) of CallLog may be different, but the MIME data type of CallLog remains the same.

Hence, in order to correctly transit to the pre-defined user interface, the MIME data type of the pre-defined user interface may first be identified, then the package name, i.e., the Package, is obtained by using the MIME data type.

At block S52, the package name corresponding to the MIME data type of the pre-defined user interface is searched for.

In this block, the package name may be searched for by using a package manager provided by the Android system.

At block S53, an intent including the MIME data type and the package name of the pre-defined user interface is generated as the request for transiting to the pre-defined user interface.

Through the procedures in blocks S51 to S53, the request for transiting to the pre-defined user interface is generated.

Figure 6:
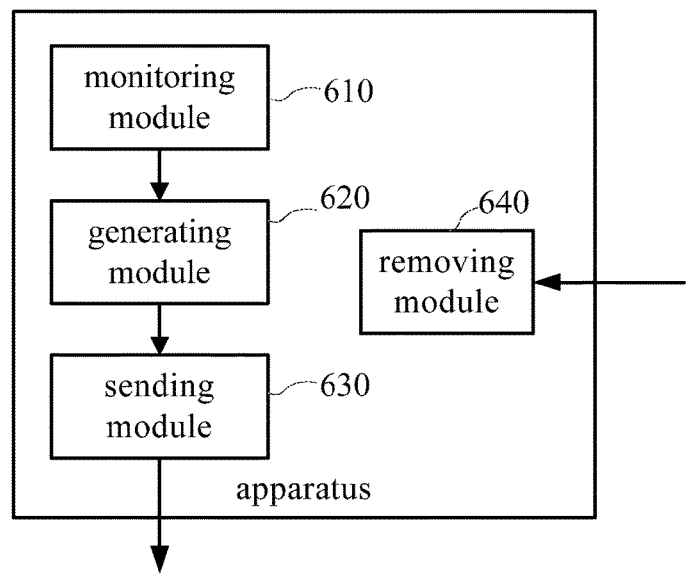
FIG. 6 is a block diagram illustrating modules of an apparatus in accordance with an example of the present disclosure.

FIG. 6 is a block diagram illustrating modules of an apparatus in accordance with an example of the present disclosure. As shown in FIG. 6, the apparatus may include the following components.

A monitoring module 610 monitors in real time whether a call history database includes missed call data labeled as unread.

A generating module 620 generates a request for transiting to a pre-defined user interface after the monitoring module 610 detects missed call data labeled as unread in the call history database. The pre-defined user interface is pre-defined for removing a missed call icon.

A sending module 630 sends the request generated by the generating module 620 to a system for controlling transition between user interfaces.

A removing module 640 receives a response sent by the system in reply to the request, implements transition from the currently-displayed user interface of an application to the pre-defined user interface to remove the missed call icon displayed by a phone application in a notification bar, and remove the label of unread added to the missed call data in the call history database.

In an example, the removing module 640 may check in real time whether the label of unread added to all missed call data has been removed from the call history database.

If the label has been removed, the removing module 640 controls the apparatus to transit from the pre-defined user interface to the user interface of the application.

If the label has not been removed, the removing module 640 continues to check in real time whether the label of unread added to all missed call data has been removed from the call history database.

In an example, the removing module 640 may start a timer when removing the label of unread added to the missed call data in the call history database, judge whether the timer has expired, and control the apparatus to transit from the pre-defined user interface to the user interface of the application after detecting the timer has expired.

In an example, the removing module 640 may receive a return identity triggered by a user via the user interface of the application, and instruct the sending module to send a request for transiting to a host screen to a background system for controlling transition of user interfaces. The return identity may include, but not limited to, a return key.

The removing module 640 may control the apparatus to transit from the user interface of the application to the host screen.

In an example, the generating module 620 may generate the request for transiting to the pre-defined user interface by:
  identifying an MIME data type of the pre-defined user interface;
  searching for a package name corresponding to the MIME data type;
  generating a request which includes the MIME data type and the package name.

In an example, the system is an Android system.

The request is generated based on an intent mechanism provided by the Android system.

The pre-defined user interface is a user interface presenting call history.

According to various examples, a first application without root permissions monitors in real time whether a call history database includes missed call data labeled as unread, and generates a request for transiting to a pre-defined user interface after detecting missed call data labeled as unread. The pre-defined user interface is an interface for removing a missed call icon, i.e., a user interface of a second application having root permissions to remove the missed call icon. The quick transition from the currently-displayed user interface of the first application to the pre-defined user interface is implemented by using the request. Thus, the missed call icon can be removed by an application without root permissions instead of can only be removed by applications with root permissions as in the conventional art.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

The hardware modules according to various examples may be implemented by hardware or a hardware platform with necessary software. The software may include machine-readable instructions which are stored in a non-statutory storage medium. Thus, the examples may be embodied as software products.

In various examples, the hardware may be dedicated hardware or general-purpose hardware executing machine-readable instruction. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations.

The machine-readable instructions corresponding to modules as shown in FIG. 2 or FIG. 6 may cause an operating system running in a computer to implement part or all of the operations described herein. A non-statutory computer-readable storage medium may be a storage device in an extension board inserted in the computer or a storage in an extension unit connected to the computer. In this example, a CPU in the extension board or the extension unit executes at least part of the operations according to the instructions based on the program codes to realize the technical scheme of any of the above examples.

The non-statutory computer-readable storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The scope of the claims should not be limited by the embodiments set forth in the examples, but should be given the broadest interpretation consistent with the description as a whole.

The invention claimed is:

1. A method for removing notification icons, comprising:
   displaying a notification icon corresponding to newly-obtained data on a first user interface;
   obtaining, by a first application which does not have permission of removing the notification icon, information of the newly-obtained data;
   identifying, by the first application, a Secure Multipurpose Internet Mail Extensions (MIME) data type of a second user interface for removing the notification icon by using the information of the newly-obtained data;
   obtaining, by the first application, a package name of a second application which has a permission of removing the notification icon by using the MIME data type;
   sending, by the first application, a request which includes the MIME data type and the package name to a control logic of a background system to start the second application; and
   removing, by the second application, the notification icon from the first user interface by presenting a second user interface for removing the notification icon;
   establishing and start a timer after removing the notification icon from the first user interface;
   judging whether the timer has expired, implementing transition from the second user interface to a third user interface of the first application when detecting the timer has expired.

2. The method of claim 1, wherein
   obtaining the information of the newly-obtained data comprises: accessing a database to determine whether the database includes data labeled as unread, obtaining information of the data after detecting the data labeled as unread; or registering at a notification service, and receiving a notification indicating the database includes data labeled as unread.

3. The method of claim 1,
   wherein the obtaining the pre-defined data type corresponding to the newly-obtained data comprises: searching first relations which associate pre-defined data information with data types for the data type corresponding to the newly-obtained data; and
   wherein the obtaining information of the second application comprises: searching second relations which associate the pre-defined data types with applications for the information of the second application.

4. The method of claim 1, further comprising:
   storing a third user interface of the first application that is currently displayed before starting the second application; and
   displaying the stored third user interface of the first application after the notification icon has been removed.

5. The method of claim 1, wherein the obtaining information of the newly-obtained data comprises: monitoring whether a call history database includes missed call data labeled as unread; and
   wherein the starting the second application comprises: generating a request for transiting to a pre-defined user interface of the second application after detecting the call history database includes missed call data labeled as unread, and sending the request to a background system for controlling transition of user interfaces, the pre-defined user interface is the second interface for removing a missed call icon;
   receiving a response to the request sent by the background system, implement transition from a currently-displayed application user interface of the first application to the pre-defined user interface to remove the missed call icon displayed by a phone application in a notification bar, and removing the label of unread added to the missed call data in the call history database.

6. The method of claim 5, further comprising:
checking whether the label of unread added to all missed call data has been removed from the call history database;
implementing transition from the pre-defined user interface to the application user interface; and
continuing to check in real time whether the label of unread added to all missed call data has been removed from the call history database if the label has not been removed.

7. The method of claim 1, further comprising:
sending a second request for transiting to a host screen to the background system for controlling transition of user interfaces after receiving a return identity triggered by a user via a third user interface of the first application; and
receiving a response to the second request sent by the background system, and implementing transition from the third user interface of the first application to the host screen;
wherein the return identity comprises a return key.

8. The method of claim 1, wherein the background system is an Android system;
the request is generated based on an intent mechanism provided by the Android system.

9. The method of claim 1, wherein the second user interface is a user interface presenting call history, the notification icon is displayed in a notification bar on the first user interface.

10. An apparatus for removing notification icons, comprising a processor and memory, the memory comprises:
computer-readable instructions executable by the processor to display a notification icon corresponding to newly-obtained data on a first user interface;
computer-readable instructions for a first application which does not have permission of removing the notification icon, executable by the processor to obtain a Secure Multipurpose Internet Mail Extensions (MIME) data type of a second user interface for removing the notification icon by using information of the newly-obtained data, obtain a package name of a second application which has a permission of removing the notification icon by using the MIME data type, and send a request which includes the MIME data type and the package name to a control logic of a background system to start the second application; and
computer-readable instructions for a second application, executable by the processor to remove the notification icon from the first user interface by presenting a second user interface for removing the notification icon, wherein the instructions for the first application are executable by the processor to start a timer after removing the notification icon from the first user interface, judge whether the timer has expired, and control the apparatus to transit from the second user interface to a third user interface of the first application after detecting the timer has expired.

11. The apparatus of claim 10, wherein the instructions for the first application are executable by the processor to:
monitor whether a database includes data labeled as unread, and obtain the data labeled unread after detecting the data labeled as unread in the database.

12. The apparatus of claim 10, wherein the instructions for the first application are executable by the processor to:
monitor whether a call history database includes missed call data labeled as unread;
generate a request for transiting to a pre-defined user interface of the second application after the monitoring module detects missed call data labeled as unread in the call history database, wherein the pre-defined user interface is the second interface for removing a missed call icon;
send the request generated by the generating module to a background system for controlling transition between user interfaces; and
receive a response sent by the background system in reply to the request, implement transition from a currently-displayed user interface of the first application to the pre-defined user interface to remove the missed call icon displayed by a phone application in a notification bar, and remove the label of unread added to the missed call data in the call history database.

13. The apparatus of claim 12, wherein the instructions for the first application are executable by the processor to check whether the label of unread added to all missed call data has been removed from the call history database;
control the apparatus to transit from the pre-defined user interface to the user interface of the application if the label has been removed; and
continue to check whether the label of unread added to all missed call data has been removed from the call history database if the label has not been removed.

14. The apparatus of claim 10, wherein the instructions for the first application are executable by the processor to receive a return identity triggered by a user via a third user interface of the first application, and instruct the sending module to send a second request for transiting to a host screen to a background system for controlling transition of user interfaces, wherein the return identity comprises a return key; and
control the apparatus to transit from the third user interface of the first application to the host screen.

* * * * *